United States Patent [19]

Matchett

[11] Patent Number: 4,693,823

[45] Date of Patent: Sep. 15, 1987

[54] LIQUID FILTER

[75] Inventor: Robert W. Matchett, Dover, N.H.

[73] Assignee: Fibredyne, Inc., Dover, N.H.

[21] Appl. No.: 879,061

[22] Filed: Jun. 26, 1986

[51] Int. Cl.⁴ ............................................. B01D 25/06
[52] U.S. Cl. .................................... 210/266; 210/282;
  210/285; 210/288; 210/493.5; 210/505
[58] Field of Search ............... 210/266, 282, 288, 289,
  210/291, 285, 493.5, 502.1, 503-509

[56] References Cited

U.S. PATENT DOCUMENTS

| 3,174,623 | 3/1965 | Sloan | 210/288 |
|---|---|---|---|
| 3,266,628 | 8/1966 | Price | 210/288 |
| 3,319,791 | 5/1967 | Horne | 210/288 |
| 4,032,457 | 6/1977 | Matchett | 210/489 |

Primary Examiner—Ivars Cintins
Attorney, Agent, or Firm—Hayes, Davis & Soloway

[57] ABSTRACT

A liquid filtered cartridge comprising a hollow cylindrical body with top and bottom bulkheads closing top and bottom ends, respectively, thereof. The body has a plurality of peripheral input openings into the top chamber for the introduction of liquid and further includes a plurality of space inwardly facing peripheral ridges on the inner surface for preventing laminar flow of the liquid therethrough adjacent the inner walls of the body. Intermediate bulkheads having passageways therethrough are spaced between the top and bottom bulkheads and divide the liquid filter cartridge into chambers and a granular absorbent material is disposed within one of the chambers. Filter means are disposed within the other chambers and prevent the flow of granular material out of the chamber containing the granular material. An outlet conduit is axially disposed within the body communicating with the bottom chamber through an intermediate bulkhead on one end, and the other end passing upward through the intermediate and top bulkheads and being the outlet for the filtered liquid. The conduit includes a plurality of space outwardly faced peripheral ridges on the outer surface thereof for preventing laminar flow liquid adjacent the conduit.

31 Claims, 7 Drawing Figures

LIQUID FILTER

BACKGROUND OF THE INVENTION

The present invention relates to liquid filters for water and the like and, more particularly to a liquid filter cartidge comprising a hollow cylindrical body having top and bottom bulkheads closing top and bottom ends, respectively, thereof, the body having a plurality of peripheral input openings through the body into the top chamber for the introduction of liquid into the filter, the body further including a plurality of spaced inward-facing peripheral ridges on the inner surface of the body for preventing laminar flow of liquid therethrough adjacent the inner walls of the body; a top intermediate bulkhead disposed in spaced relationship with the top bulkhead to form a top chamber therebetween, the top intermediate bulkhead having passageways therethrough for the passage of liquid; a bottom intermediate bulkhead disposed in spaced relationship with the bottom bulkhead to form a bottom chamber therebetween, the top and bottom intermediate bulkheads being spaced from one another to form a middle chamber therebetween within the body, the bottom intermediate bulkhead having a passageway disposed about the outer periphery thereof for the passage of liquid; a quantity of activated granular adsorbent material disposed within the middle chamber; top filter means disposed between the peripheral input openings and the grandular material for initially filtering liquid coming into the body and for preventing backflow of the granular material out of the middle chamber into the peripheral input openings, the top filter means comprising an annular pad of compressed fibrous material impregnated with a quantity of carbon material disposed within the top chamber between the top bulkhead and the top intermediate bulkhead; an outlet conduit axially disposed within the body communicating with the bottom chamber through the bottom intermediate bulkhead on one end, the other end of the outlet conduit passing upward through the top intermediate bulkhead and the top bulkhead and being the outlet for filtered liquid from the filter cartridge, the conduit including a plurality of spaced outward-facing peripheral ridges on the outer surface thereof for preventing laminar flow of liquid therealong adjacent the conduit; and, bottom filter means disposed between the passageway of the bottom intermediate bulkhead and the point of communication of the outlet conduit therethrough on the one end for preventing outflow of the granular material from the middle chamber into the outlet conduit, the bottom filter means comprising an annular pad of compressed fibrous material impregnated with a quantity of carbon material disposed within the bottom chamber between the bottom bulkhead and the bottom intermediate bulkhead, whereby liquid entering the filter passes radially inward through the top filter before passing through the passageways in the top intermediate bulkhead to enter the middle chamber, and liquid exiting the middle chamber and entering the bottom chamber passes radially inward through the bottom filter before entering the outlet conduit.

Cartridge type liquid filters are well known in the art, particularly for residential and light commercial use in the treating of water for drinking and other uses. As far as is known by the applicant herein, all of the disposable granular activated carbon (GAC) units commercially available today for such use basically consist of plastic canisters filled with activated carbon granules, normally either 14×40 or 20×50 mesh. Typically, fibrous pad arrangements are used to pre-filter the incoming water and post-filter the treated water which normally contains some content of carbon "fines". Typical structural arrangements for prior art GAC filters are shown in simplified form in FIGS. 1-3. Examples corresponding to FIGS. 1-3 can be found in U.S. Pat. Nos. 4,104,170 by Nedza, 4,350,590 by Robinson and 4,131,544 by Elahi as well as 4,032,457 of the Applicant herein and 183,599 by Sinclaire.

Turning first to FIG. 1, a filter assembly, generally indicated as 10, is shown in simplified form. Filter assembly 10 comprises an outer filter housing 12 in which a replaceable filter cartridge 14 is disposed. The filter housing 12 can be opened and reclosed to replace the filter cartridge 14 if an when necessary. Housing 12 has an inlet pipe 16 in its sidewalls into which water, as symbolized by the arrows 18, enters. The inlet pipe 16 can be located as desired, as long as it introduces the water into the area 20 surrounding the filter cartridge 14. An outer pipe 22 also communicates through the endwall and provides an outlet for the filtered water exiting the filter assembly 10. Outlet pipe typically has a nipple 24 extending into the housing 12 onto which the filter cartridge is press fit. The filter cartridge comprises a closed cylindrical body 26 having a plurality of peripheral holes 28 in the sidewalls through which water 18 can enter. The body 26 if filled with granular activated charcoal 30 of the type previous described. A post-filter pad 32 is provided adjacent the opening of the outlet pipe 22 so as to filter out any charcoal fines. As shown by the various water arrows 18, the water to be filtered enters the area 20 through the inlet pipe 16 thus surrounding the filter cartridge 14. It then passes through the holes 28, through the activated charcoal granules 30, through the post-filter pad 32, and out the outlet pipe 22.

The filter assembly 10' of FIG. 2 is quite similar to that of FIG. 1 except for the replacement of the plurality of holes 28 by a single entrance hole 34 in the bottom of the filter cartridge 14'. The hole 34, of course, contains means (not shown) for preventing the granules 30 from falling out. Again, as shown by the water arrows 18, the water enters the housing 12 through the inlet pipe 16 and surrounds the filter cartridge 14'. In this case, however, the water rises upward through the granules 30 and, theoretically, is all equally filtered thereby.

The filter cartridge 14" of FIG. 3 is a variation of the filter assembly 10' of FIG. 2. In this instance, because of the single entrance and exit holes, the outer filter housing is eliminated and the inlet pipe 16 and outlet pipe 22 are connected directly to the body 26" of the filter cartridge 14".

Generally, the prior art filters as described above are mounted vertically in the manner depicted in the drawings so that gravity will work to advantage; that is, the filtering activated charcoal granules will tend to be compacted to the bottom of the filter. Unfortunately, the natural tendencies of fluids and granules in a fluid stream tend to counter the intended manner of operation. First, the upward flow of the water 18 tends to fluidize the granules 30 causing them to move and shift in the manner of a fluid instead of maintaining their fixed and compacted positions. Thus, channels of least resistance through the granules 30 tend to form. As a result, instead of passing through a tortuous path tending to provide maximum exposure to the action of the activated charcoal of the granules 30, the water 18 tends to move along paths providing a minimum of exposure to any filtering effect. Similarly, a laminar flow region tends to form adjacent the inner walls 36 of the filter body 26, 26', 26" where the granules 30 are moved slightly away from the walls 36 and the water 18 can slip through between the walls 36 and the granules 30 with virtually no filtering action. In an attempt to prevent the above-described counter productive phenomena, various attempts have been made to create a physical downward pressure on the granules. For example, many manufacturers of such units normally incorporate some type of open cell, resilient foam at the inner top of the filter above the granules 30 to keep the carbon bed under som degree of compaction during the on-off cycle of water flow.

While there is some help in the use of foam and such, some fluidization still takes place—with an additional detrimental effect; that is, even a slight fluidization causes the granules 30 to work against one another producing additional "fines" which are small enough to slip between the larger granules 30. The process is a deteriorating one with respect to the operation of the filter. Primarily, the fines must be caught by an effective post-filter so as to prevent their entering the filtered water stream. An effective post-filter, unfortunately, also becomes fairly quickly "plugged" with the fines, resulting in, initially, reduction in performance and, ultimately, early failure with the need to replace. Consequently, post-filters in the prior art have been relatively open pored in which some fines are allowed to pass to avoid premature failure with the result that post-filters have been less than satisfactory.

Wherefore, it is the object of the present invention to provide a liquid filter of the activated granular adsorbent carbon type which provides maximum filtering effect but with corresponding long life and a minimum tendency and deteriorate.

SUMMARY

The foregoing object has been realized by the liquid filter cartridge of the present invention comprising, a hollow cylindrical body having first and second bulkheads closing first and second ends, respectively, thereof, the body having input means for introducing a liquid to be filtered into the body adjacent the first end; an intermediate bulkhead disposed in spaced relationship with the second bulkhead to form a first chamber therebetween, the intermediate bulkhead further being spaced from the first bulkhead so as to form a second chamber therebetween, the intermediate bulkhead having a peripheral passageway for the passage of liquid; a quantity of granular adsorbent material such as activated carbon disposed within the second chamber; first filter means disposed for preventing backflow of the granular material out of the second chamber into the input means; an outlet conduit axially disposed within the body communicating with the first chamber through the intermediate bulkhead on one end, and other end of the outlet conduit passing through the first bulkhead and being the outlet for filtered liquid from the filter cartridge; and, second filter means disposed between the passageway of the intermediate bulkhead and the point of communication of the outlet conduit therethrough on the one end for preventing outflow of the granular material from the second chamber into the outlet conduit.

In the preferred embodiment, the first and second filter means each include an annular pad of compressed fibrous material impregnated with a quantity of carbon material which is disposed within the chamber such that liquid entering the first chamber passes radially inward through the pad.

Further in the preferred embodiment, the outlet conduit is sized to pass liquid therethrough at a lesser rate than the inlet means such the liquid entering the filter creates a hydraulic press compacting the granular material.

Also in the preferred embodiment, the body includes a plurality of spaced inward-facing peripheral ridges on the inner surface of the body within the second chamber for preventing laminar flow of liquid therethrough adjacent the body and for forcing the liquid to flow through the granular adsorbent material; and the conduitd includes a plurality of spaced outward-facing peripheral ridges on the outer surface of the conduit within the second chamber for preventing laminar flow of liquid therealong adjacent the conduit and for forcing the liquid to flow through the granular adsorbent material.

DESCRIPTION OF THE PREFERRED EMBODIMENT

Figure 3:
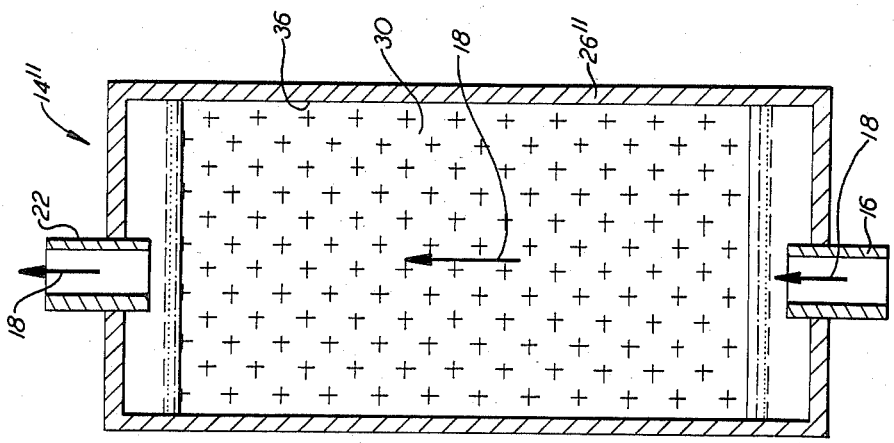
FIG. 3 is a simplified cutaway elevation drawing of a prior art liquid filter of a third type.
Figure 2:
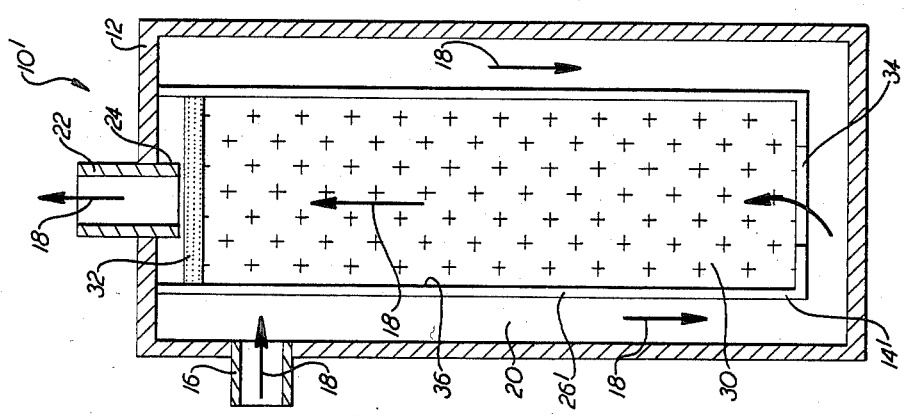
FIG. 2 is a simplified cutaway elevation drawing of a prior art liquid filter of a second type.
Figure 1:
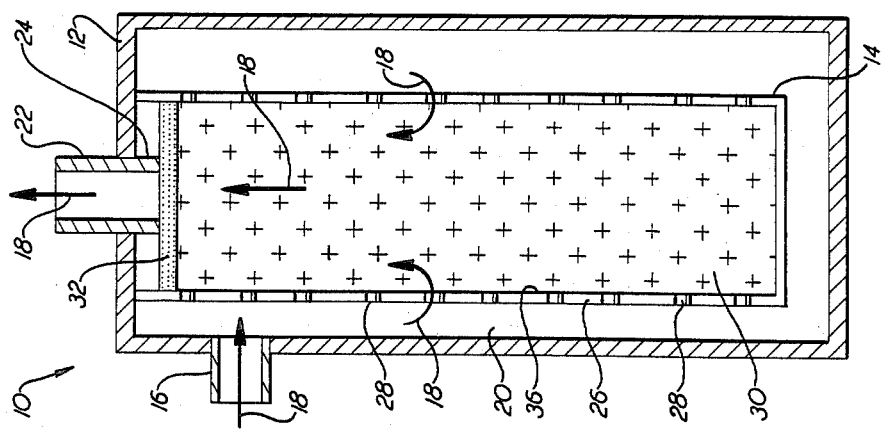
FIG. 1 is a simplified cutaway elevation drawing of a prior art liquid filter of a first type.
Figure 4:
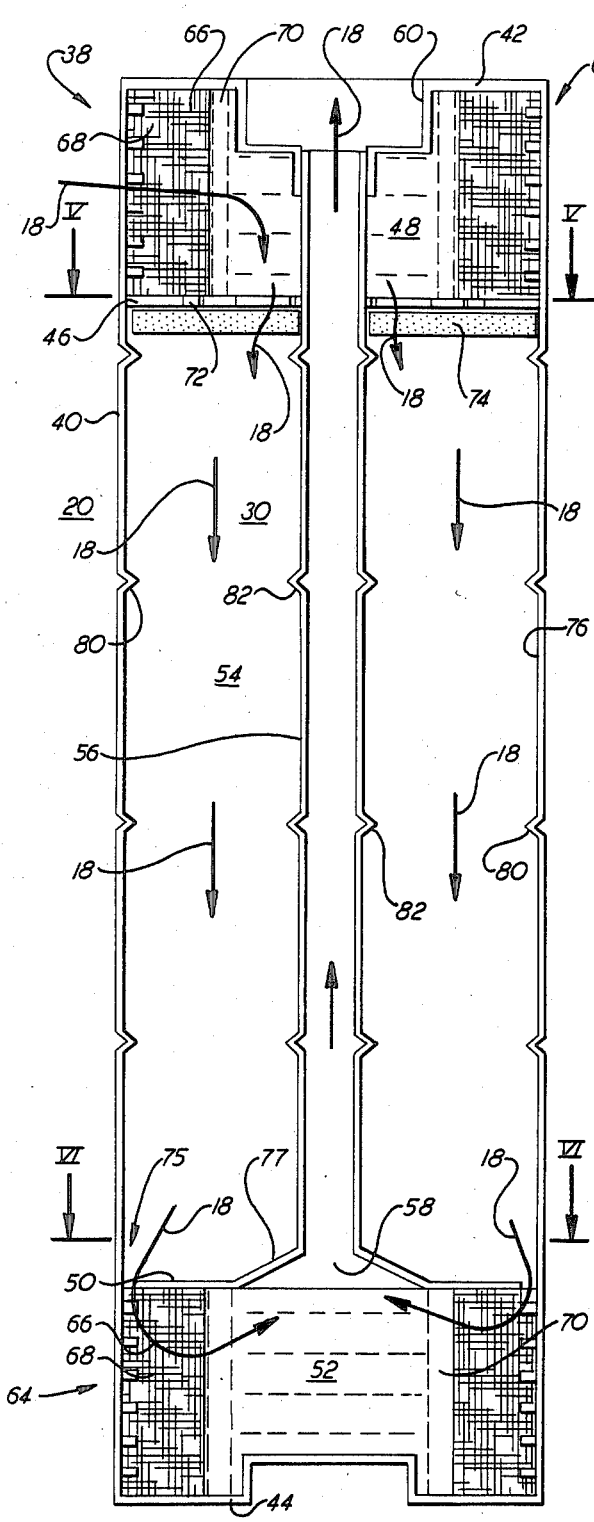
FIG. 4 is a detailed cutaway elevation drawing of a filter cartridge according to the present invention in its preferred embodiment.
Figure 5:
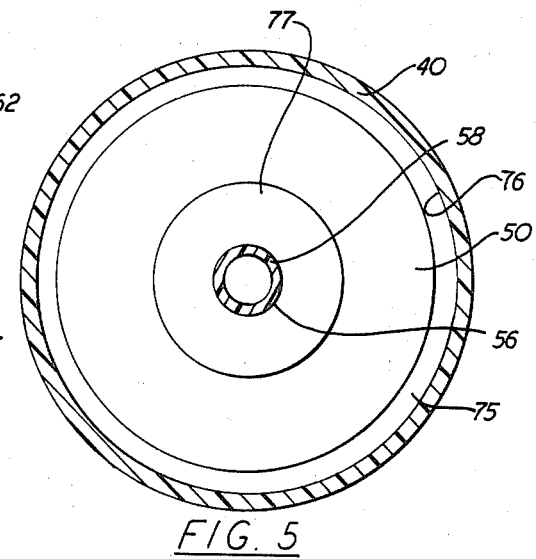
FIG. 5 is a cutaway drawing of the filter of FIG. 4 in the plane V—V showing the construction of the top intermediate bulkhead.
Figure 6:
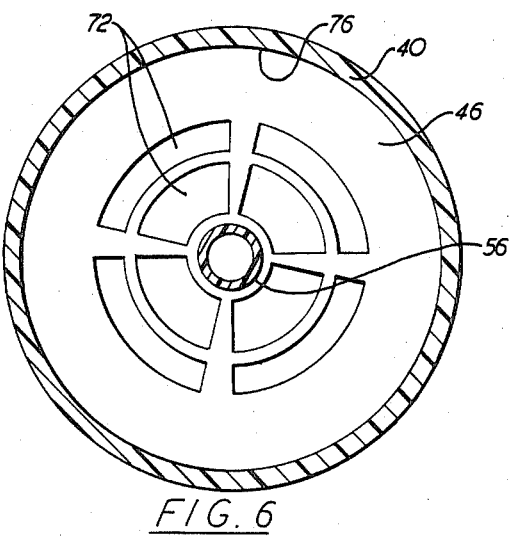
FIG. 6 is a cutaway drawing of the filter of FIG. 4 in the plane VI—VI showing the construction of the bottom intermediate bulkhead.
Figure 7:
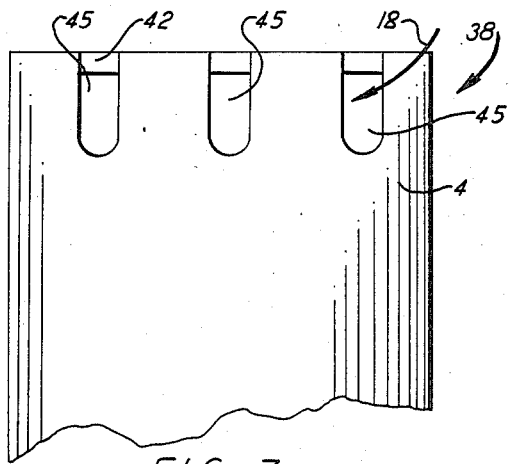
FIG. 7 is an elevation view of the top of the filter of FIG. 4 showing the holes through which incoming water enters.

The preferred embodiment of a filter cartridge according to the present invention is shown cutaway in detail in FIG. 4 and generally indicated as 38 therein. Further details are shown in FIGS. 5–7. The filter cartridge 38 is of the type intended to be housed in an outer filter housing such as that indicated as 12 in FIGS. 1 and 2; but, for simplicity and to avoid redundancy in the drawings, the housing 12 is not shown. The surrounding area 20 into which incoming water 18 is introduced in use is, however, so labelled.

The filter cartridge 38 comprises a hollow cylindrical canister body 40 having top and bottom bulkheads 42, 44, respectively, closing its ends. The body 40 can be made of any of a number of well known and presently available plastic materials which are inert and, thus, will not rust or corrode or introduce undesirable materials into the water stream. The body can be conveniently molded as two pieces to be joined such as by glue after insertion of the inner components. Such procedures are well known to those skilled in the art and, therefore, will not be described in detail herein.

The body 40 is provided with a plurality of equally spaced peripheral holes 45 therethrough adjacent the top bulkhead 42 through which water 18 from the area 20 can enter into the body 40 as best seen with reference to FIG. 7. A first or top intermediate bulkhead 46 is disposed in spaced relationship to the top bulkhead 42 so as to form a first or top chamber 48 therebetween. A second or bottom intermediate bulkhead 50 is disposed in spaced relationship to the bottom bulkhead 44 so as to form a second or bottom chamber 52 therebetween. As can be seen from the drawing of FIG. 4, chambers 448 and 52 are relatively small while the intermediate bulkheads 46 and 50 are spaced from one another at a relatively large distance so as to form a large, elongated, third or middle chamber 54 therebetween. Activated granular adsorbent carbon are disposed within the middle chamber 54. For simplicity, the granules 30 are not depicted in the drawing of FIG. 4; however, the label "30" is shown at the place where they would be.

An outlet conduit 56 is axially disposed within the body 40. The conduit 56, like the intermediate bulkheads 46, 50 and the body 40, is of plastic so that the various connections described hereinafter can be made easily during assembly as by the use of plastic glues. The conduitd 56 communicates with the bottom chamber 52 on its bottom end via hole 58 in the center of the bottom intermediate bulkhead 50. That connection should be made by gluing to maintain the position of the parts. Optionally, the conduit 56 and bottom intermediate bulkhead 50 could be of unitary construction. The top end of the conduit 56 passes through the top intermediate bulkhead 46 and the top bulkhead 42 and is the outlet opening for filtered water from the cartridge 38. For use as a replacement for the previously described prior art filter cartridges of FIGS. 1 and 2, the top end of the conduit 56 communicates with socket 60 in the top bulkhead 42, which is adapted to fit onto the nipple 24. To prevent movement of the parts, this joint should also be glued, or the like.

If water (or any other liquid being filtered) were free to pass through the top and bottom intermediate bulkheads 46, 50, it will be recognized that the water flow would be into the top chamber 48 through the holes 45; from there into and down through the middle chamber 54; from thence into the bottom chamber 52 and out the conduit 56. As should be recognized, the novel arrangement of the present invention, while being a direct replacement for the prior art filter cartridges of FIGS. 1 and 2 described above, changes the whole manner of operation and fluid flow such as to counteract the detrimental fluid flow effects of the prior art cartridges. Instead of flowing upwards and fluidizing the grandules 30, in the filter cartridge 38 of the present invention, the fluid flows downward, thus working with gravity (instead of against it) to compact the granules 30 so as to provide an optimized filtering action while virtually eliminating "working" and the production of fines thereby. Additionally, in the present invention, the conduit 56 is sized such that the holes 45 can receive water flow at a greater rate than the conduit 56 can evacuate it. Accordingly, a back pressure is created causing the incoming water to act as a hydraulic press on the granules 30, forcing them into their compacted position. Having thus described the structure of the filter cartridge 38 broadly, it will now be described in greater detail.

A first or top filter, generally indicated as 62, is associated with the top chamber 48 and top intermediate bulkhead 46 to pre-filter the water entering the cartridge 38 and prevent backflow of the granules 30 (or any fines) out of the middle chamber 54 and out of the holes 45. A second or bottom filter, generally indicated as 64, is similarly associated with the bottom chamber 52 and bottom intermediate bulkhead 50 to post-filter the water and prevent outflow of the granules 30 (or any fines) from the middle chamber 54 into the conduit 56.

Turning first with particularly to the top filter 62 and its associated structure, a cylindrical pad filter element 66 is peripherally disposed within the top chamber 48 between the two bulkheads 42, 46. The element is constructed according to technology described in the applicant's above-referenced, issued U.S. Pat. No. 4,032,457 entitled PLURAL STATE FILTERCARTRIDGE WHEREIN AT LEAST ONE STAGE COMPRISES PULVERIZED PARTICULATE MATERIAL, the teachings of which are incorporated herein by reference, and is a compressed, pulverized particulate material impregnated with activated carbon material so as to provide additional beneficial carbon filtering of the water. The outer surface contains notched pleats 68 to provide increased surface area and encourage water to flow therethrough and not around. The element 66 is confined between the body 40 on the outer periphery and a perforated, cylindrical, plastic sleeve 70 on the inner periphery. Thus, the element is positively prevented from deforming and wadding from any unexpected water pressure, or the like. The top intermediate bulkhead 46 contains a plurality of large holes 72 therethrough as best seen with reference to FIG. 6. A cylindrical foam plastic pad 74 is disposed within the middle chamber 54 against the bulkhead 46 and serves two purposes. First, it creates a pressure against the granules 30 during shipment and the on-off cycles of use in the manner previously described with respect to the prior art. Second, it prevents outflow of any granules 30 or fines through the holes 72. As a result, entering water 18 passes radially inward through the element 66 into the top chamber 48. On the bottom of the element 66, it passes directly through holes 72 into the middle chamber 54. On the inner periphery, it passes through the perforations of the sleeve 70 into space 76 within the top chamber 48 from whence it also passes through holes 72 into the middle chamber 54. It should be noted that this arrangement tends to spread the incoming water evenly across the top of the granules 30.

Turning now to the bottom filter 64 and its associated structure, an identical cylindrical pad filter element 66 to that described above is periphery disposed within the bottom chamber 52 between the two bulkheads 44, 50. In like manner, the bottom element 66 is confined between the body 40 on the outer periphery and a perforated, cylindrical, plastic sleeve 70 on the inner periphery. As will be noted from the drawing of FIG. 5, the bottom intermediate bulkhead 50 is solid throughout except that the outer periphery of the bulkhead 50 is spaced from the inner walls of the body 40 so as to create a peripheral space 75 for water to flow through. Additionally, it is also preferred that the bulkhead 50 have an inverted funnel shaped portion 77 as shown. As a result of the above-described structure, water 18 flowing down through the granules 30 in the middle chamber 54 is diverted radially outward at the bottom by the funnel shaped portion 77 towards the outer periphery of the bulkhead 50 from whence it flows through space 75 into the area at the outer periphery of the bottom element 66. From there, in the manner as described above with respect to the top filter 62, the water 18 flows radially inward through the bottom element 66 into the center of the bottom chamber 54, from whence the funnel shaped portion 77 of the bulkhead 50 acts oppositely on this side to smoothly divert the water towards its center and into the conduit 56.

As will be recalled from the description of the prior art above, prior art filters suffer from various channeling problems, the elimination of which, while addressed in the object of the invention, have not yet been addressed with respect to the preferred embodiment. The solution to those problems according to the present invention will now be described. As shown in the drawing of FIG. 4, the body 40 contains a plurality of peripheral, inward-facing ridges 80 on its inner walls 76 within the area of middle chamber 54. Similarly, the conduit 56 contains a plurality of outward-facing ridges 82 on its outer surface within the area of middle chamber 54. The ridges 80, 82 are intended to, and do, create a turbulence along the surfaces of the inner walls 76 of the body 40 and the conduit 56. As a result, the laminar flow area is eliminated and the water 18 flowing therealong is diverted back into the bed of granules 30.

Thus, it can be seen that the filter cartridge of the present invention in its preferred embodiment has accomplished all the objects set forth above, as well as others which will be appreciated by those skilled in the art.

Wherefore, having thus described my invention, I claim:

1. A liquid filter cartridge comprising:
   (a) a hollow cylindrical body having first and second bulkheads closing first and second ends, respectively, thereof, said body having input means for introducing a liquid to be filtered into said body adjacent said first end;
   (b) a first intermediate bulkhead disposed in spaced relationship with said first bulkhead to form a first chamber therebetween, said first intermediate bulkhead having a passageway therethrough for the passage of liquid;
   (c) a second intermediate bulkhead disposed in spaced relationship with said second bulkhead to form a second chamber therebetween, said first and second intermediate bulkheads being spaced from one another to form a third chamber therebetween within said body, said second intermediate bulkhead having a passageway therethrough for the passage of liquid;
   (d) a quantity of granular adsorbent material disposed within said third chamber;
   (e) first filter means disposed between said input means and said granular material for initially filtering liquid coming into said body and for preventing backflow of said granular material out of said third chamber into said input means;
   (f) an outlet conduit axially disposed within said body communicating with said second chamber through said second intermediate bulkhead on one end, the other end of said outlet conduit passing through said first intermediate bulkhead and said first bulkhead being the outlet for filtered liquid from the filter cartridge;
   (g) second filter means disposed between said passageway of said second intermediate bulkhead and said point of communication of said outlet conduit therethrough on said one end for preventing outflow of said granular material from said third chamber into said outlet conduit; and
   (h) said body includes means within said third chamber for preventing laminar flow of liquid therethrough adjacent said body and for forcing the liquid to flow through the granular material.

2. The filter of claim 1 wherein:
   said laminar flow preventing means comprises a plurality of spaced inward-facing peripheral ridges on the inner surface of said body within said third chamber.

3. The filter of claim 1 wherein:
   said conduit includes means within said third chamber for preventing laminar flow of liquid therethrough adjacent said conduit and for forcing the liquid to flow through the granular material.

4. The filter of claim 3 wherein:
   said laminar flow preventing means comprises a plurality of spaced outward-facing peripheral ridges on the outer surface of said conduit within said third chamber.

5. The filter of claim 1 wherein:
   (a) said first filter means is an annular pad of compressed fibrous material impregnated with a quantity of carbon material being disposed within said first chamber between said first bulkhead and said first intermediate bulkhead; and,
   (b) said input means comprises a plurality of peripheral input openings through said body into said first chamber whereby liquid entering the filter passes radially inward through said pad before passing through said passageways in said first intermediate bulkhead to enter said third chamber.

6. The filter of claim 5 wherein:
   the outer peripheral surface of said pad contains pleats to catch and divert liquids into and through said pad.

7. The filter of claim 1 wherein:
   (a) said second filter means is an annular pad of compressed fibrous material impregnated with a quantity of carbon material being disposed within said second chamber between said second bulkhead and said second intermediate bulkhead; and,
   (b) said passageways through said second intermediate bulkhead are disposed only about the outer periphery thereof whereby liquid exiting said third chamber and entering said second chamber passes radially inward through said pad before entering said outlet conduit.

8. The filter of claim 7 wherein:
   the outer peripheral surface of said pad contains pleats to catch and divert liquids into and through said pad.

9. The filter of claim 1 wherein:
   said outlet conduit is sized to pass liquid therethrough at a lesser rate than said inlet means such that liquid entering the filter creates a hydraulic press compacting said granular material.

10. A liquid filter cartridge comprising:
    (a) a hollow cylindrical body having first and second bulkheads closing first and second ends, respectively, thereof, said body having input means for introducing a liquid to be filtered into said body adjacent said first end;
    (b) an intermediate bulkhead disposed in spaced relationship with said second bulkhead to form a first chamber therebetween, said intermediate bulkhead further being spaced from said first bulkhead so as to form a second chamber therebetween, said intermediate bulkhead having a peripheral passageway for the passage of liquid;

(c) a quantity of granular adsorbent material disposed within said second chamber;

(d) first filter means disposed for preventing backflow of said granular material out of said second chamber into said input means;

(e) an outlet conduit axially disposed within said body communicating with said first chamber through said intermediate bulkhead on one end, the other end of said outlet conduit passing through said first bulkhead and being the outlet for filtered liquid from the filter cartridge;

(f) second filter means disposed between said passageway of said intermediate bulkhead and said point of communication of said outlet conduit therethrough on said one end for preventing outflow of said granular material from said second chamber into said outlet conduit; and (g) said second filter means is an annular pad of compressed fibrous material impregnated with a quantity of carbon material being disposed within said first chamber between said second bulkhead and said intermediate bulkhead whereby liquid exiting said second chamber and entering said first chamber passes radially inward through said pad before entering said outlet conduit.

11. The filter of claim 10 wherein:
the outer peripheral surface of said pad contains pleats to catch and divert liquids into and through said pad.

12. The filter of claim 10 wherein:
said outlet conduit is sized to pass liquid therethrough at a lesser rate than said inlet means such that liquid entering the filter creates a hydraulic press compacting said granular material.

13. A liquid filter cartridge comprising:
(a) a hollow cylindrical body having first and second bulkheads closing first and second ends, respectively, thereof, said body having input means for introducing a liquid to be filtered into said body adjacent said first end;

(b) an intermediate bulkhead disposed in spaced relationship with said second bulkhead to form a first chamber therebetween, said intermediate bulkhead further being spaced from said first bulkhead so as to form a second chamber therebetween, said intermediate bulkhead having a peripheral passageway for the passage of liquid;

(c) a quantity of granular adsorbent material disposed within said second chamber;

(d) first filter means disposed for preventing backflow of said granular material out of said second chamber into said input means;

(e) an outlet conduit axially disposed within said body communicating with said first chamber through said intermediate bulkhead on one end, the other end of said outlet conduit passing through said first bulkhead and being the outlet for filtered liquid from the filter cartridge;

(f) second filter means disposed between said passageway of said intermediate bulkhead and said point of communication of said outlet conduit therethrough on said one end for preventing outflow of said granular material from said second chamber into said outlet conduit; and (g) said body includes means within said second chamber for preventing laminar flow of liquid therethrough adjacent said body and for forcing the liquid to flow through the granular material.

14. The filter of claim 13 wherein:
said laminar flow preventing means comprises a plurality of spaced inward-facing peripheral ridges on the inner surface of said body within said second chamber.

15. The filter of claim 13 wherein:
said conduit includes means within said second chamber for preventing laminar flow of liquid therealong adjacent said conduit and for forcing the liquid to flow through the granular material.

16. The filter of claim 15 wherein:
said laminar flow preventing means comprises a plurality of spaced outward-facing peripheral ridges on the outer surface of said conduit within said second chamber.

17. A liquid filter cartridge comprising:
(a) a hollow cylindrical body having top and bottom bulkheads closing top and bottom ends, respectively, thereof, said body having input means for introducing a liquid to be filtered into said body adjacent said top end;

(b) a top intermediate bulkhead disposed in spaced relationship with said top bulkhead to form a top chamber therebetween, said top intermediate bulkhead having passageways therethrough for the passage of liquid;

(c) a bottom intermediate bulkhead disposed in spaced relationship with said bottom bulkhead to form a bottom chamber therebetween, said top and bottom intermediate bulkheads being spaced from one another to form a middle chamber therebetween within said body, said bottom intermediate bulkhead having a passageway for the passage of liquid;

(d) a quantity of granular adsorbent material disposed within said middle chamber;

(e) top filter means disposed between said input means and said granular material for initially filtering liquid coming into said body and for preventing backflow of said granular material out of said middle chamber into said input means;

(f) an outlet conduit axially disposed within said body communicating with said bottom chamber through said bottom intermediate bulkhead on one end, the other end of said outlet conduit passing upward through said top intermediate bulkhead and said top bulkhead being outlet for filtered liquid from the filter cartridge;

(g) bottom filter means disposed between said passageway of said bottom intermediate bulkhead and said point of communication of said outlet conduit therethrough on said one end for preventing outflow of said granular material from said middle chamber into said outlet conduit; and (h) said body includes means within said middle chamber for preventing laminar flow of liquid therethrough adjacent said body and for forcing the liquid to flow through the granular material.

18. The filter of claim 17 wherein:
said laminar flow preventing means comprises a plurality of spaced inward-facing peripheral ridges on the inner surface of said body within said middle chamber.

19. The filter of claim 17 wherein:
said conduit includes means within said middle chamber for preventing laminar flow of liquid therealong adjacent said conduit and for forcing the liquid to flow through the granular material.

20. The filter of claim 19 wherein:
said laminar flow preventing means comprises a plurality of spaced outward-facing peripheral ridges on the outer surface of said conduit within said middle chamber.

21. The filter of claim 17 wherein:
(a) said top filter means is an annular pad of compressed fibrous material impregnated with a quantity of carbon material being disposed within said top chamber between said top bulkhead and said top intermediate bulkhead; and,
(b) said input means comprises a plurality of peripheral input openings through said body into said top chamber whereby liquid entering the filter passes radially inward through said pad before passing through said passageways in said top intermediate bulkhead to enter said middle chamber.

22. The filter of claim 17 wherein:
(a) said bottom filter means is an annular pad of compressed fibrous material impregnated with a quantity of carbon material being disposed within said bottom chamber between said bottom bulkhead and said bottom intermediate bulkhead; and,
(b) said passageway of said bottom intermediate bulkhead is disposed about the outer periphery thereof whereby liquid exiting said middle chamber and entering said bottom chamber passes radially inward through said pad before entering said outlet conduit.

23. The filter of claim 17 wherein:
said top and bottom filter means are annular pads of compressed fibrous material impregnated with a quantity of carbon material and having an outer peripheral surface containing pleats to catch and divert liquids into and through said pad.

24. The filter of claim 17 wherein:
said outlet conduit is sized to pass liquid therethrough at a lesser rate than said inlet means such that liquid entering the filter creates a hydraulic press compacting said granular material.

25. A liquid filter cartridge comprising:
(a) a hollow cylindrical body having top and bottom bulkheads closing top and bottom ends, respectively, thereof, said body having input means for introducing a liquid to be filtered into said body adjacent said top end comprising a plurality of peripheral input openings through said body into said top chamber, said body further including means for preventing laminar flow of liquid therethrough adjacent the inner walls of said body;
(b) a top intermediate bulkhead disposed in spaced relationship with said top bulkhead to form a top chamber therebetween, said top intermediate bulkhead having passageways therethrough for the passage of liquid;
(c) a bottom intermediate bulkhead disposed in spaced relationship with said bottom bulkhead to form a bottom chamber therebetween, said top and bottom intermediate bulkheads being spaced from one another to form a middle chamber therebetween within said body, said bottom intermediate bulkhead having a passageway disposed about the outer periphery thereof for the passage of liquid;
(d) a quantity of granular adsorbent material disposed within said middle chamber;
(e) top filter means disposed between said input means and said granular material for initially filtering liquid coming into said body and for preventing backflow of said granular material out of said middle chamber into said input means, said top filter means comprising an annular pad of compressed fibrous material impregnated with a quantity of carbon material disposed within said top chamber between said top bulkhead and said top intermediate bulkhead;
(f) an outlet conduit axially disposed within said body communicating with said bottom chamber through said bottom intermediate bulkhead on one end, the other end of said outlet conduit passing upward through said top intermediate bulkhead and said top bulkhead and being the outlet for filtered liquid from the filter cartridge; and,
(g) bottom filter means disposed between said passageways of said bottom intermediate bulkhead and said point of communication of said outlet conduit therethrough on said one end for preventing outflow of said granular material from said middle chamber into said outlet conduit, said bottom filter means comprising an annular pad of compressed fibrous material impregnated with a quantity of carbon material disposed within said bottom chamber between said bottom bulkhead and said bottom intermediate bulkhead, whereby liquid entering the filter passes radially inward through said top filter before passing through said passageways in said top intermediate bulkhead to enter said middle chamber and liquid exiting said middle chamber and entering said bottom chamber passes radially inward through said bottom filter before entering said outlet conduit.

26. The filter of claim 25 wherein:
said laminar flow preventing means comprises a plurality of spaced inward-facing peripheral ridges on the inner surface of said body within said middle chamber.

27. The filter of claim 25 wherein:
said outlet conduit includes laminar flow preventing means comprising a plurality of spaced outward-facing peripheral ridges on the outer surface of said conduit within said middle chamber.

28. The filter of claim 25 wherein:
said top and bottom filter means have an outer peripheral surface containing pleats to catch and divert liquids into and through said pad.

29. The filter of claim 25 wherein:
said outlet conduit is sized to pass liquid therethrough at a lesser rate than said inlet means such that liquid entering the filter creates a hydraulic press compacting said granular material.

30. A liquid filter cartridge comprising:
(a) a hollow cylindrical body having top and bottom bulkheads closing top and bottom ends, respectively, thereof, said body having a plurality of peripheral input openings through said body into said top chamber for the introduction of liquid into the filter, said body further including a plurality of spaced inward-facing peripheral ridges on the inner surface of said body for preventing laminar flow of liquid therethrough adjacent the inner walls of said body;
(b) a top intermediate bulkhead disposed in spaced relationship with said top bulkhead to form a top chamber therebetween, said top intermediate bulkhead having passageways therethrough for the passage of liquid;

(c) a bottom intermediate bulkhead disposed in spaced relationship with said bottom bulkhead to form a bottom chamber therebetween, said top and bottom intermediate bulkheads being spaced from one another to form a middle chamber therebetween within said body, said bottom intermediate bulkhead having a passageway disposed about the outer periphery thereof for the passage of liquid;

(d) a quantity of granular adsorbent material disposed within said middle chamber;

(e) top filter means disposed between said peripheral input openings and said granular material for initially filtering liquid coming into said body and for preventing backflow of said granular material out of said middle chamber into said peripheral input openings, said top filter means comprising an annular pad of compressed fibrous material impregnated with a quantity of carbon material disposed within said top chamber between said top bulkhead and said top intermediate bulkhead, said top filter means having an outer peripheral surface containing pleats to catch and divert liquids into and through said pad;

(f) an outlet conduit axially disposed within said body communicating with said bottom chamber through said bottom intermediate bulkhead on one end, the other end of said outlet conduit passing upward through said top intermediate bulkhead and said top bulkhead and being the outlet for filtered liquid from the filter cartridge, said conduit including a plurality of spaced outward-facing peripheral ridges on the outer surface thereof for preventing laminar flow of liquid therealong adjacent said conduit; and, (g) bottom filter means disposed between said passageways of said bottom intermediate bulkhead and said point of communication of said outlet conduit therethrough on said one end for preventing outflow of said granular material from said middle chamber into said outlet conduit, said bottom filter means comprising an annular pad of compressed fibrous material impregnated with a quantity of carbon material disposed within said bottom chamber between said bottom bulkhead and said bottom intermediate bulkhead, said bottom filter means having an outer peripheral surface containing pleats to catch and divert liquids into and through said pad, whereby liquid entering the filter passes radially inward through said top filter before passing through said passageways in said top intermediate bulkhead to enter said middle chamber, and liquid exiting said middle chamber and entering said bottom chamber passes radially inward through said bottom filter before entering said outlet conduit.

31. The filter of claim 30 wherein:

said outlet conduit is sized to pass liquid therethrough at a lesser rate than said inlet means such that liquid entering the filter creates a hydraulic press compacting said granular material.

* * * * *